United States Patent Office 3,454,462
Patented July 8, 1969

3,454,462
LAMINATES OF CHLORINATED LOW UNSATU-
RATED RUBBERS AND HIGHLY UNSATURATED
RUBBERS, METHOD OF MAKING SAME AND
BLENDS OF SUCH RUBBERS
Roger S. Hawley, Cranford, N.J., assignor to Esso
Research and Engineering Company, a corporation of Delaware
No Drawing. Filed Feb. 4, 1964, Ser. No. 342,535
Int. Cl. B32b 25/18
U.S. Cl. 161—243                        24 Claims

ABSTRACT OF THE DISCLOSURE

Low unsaturated halogenated rubbers e.g., butyl and EPT, are successfully adhered to high unsaturated rubbers or blends thereof by compounding the low unsaturated rubber with zinc oxide and a quinone containing two $>C=O$ groups, e.g. p-benzoquinone, compounding the high unsaturated rubber in the conventional manner and curing the two dissimilar rubbers while in contact with one another.

---

The present invention relates to an improved method for curing low unsaturated, halogenated synthetic rubbery materials, e.g., halogenated butyl rubber and ethylene - propylene-diene terpolymers, or mixtures of low unsaturated, halogenated synthetic rubbers with more highly unsaturated rubbery polymers and to the novel compositions produced thereby. The present invention further relates to improvements is laminated rubber articles and particularly relates to the bonding and lamination of said low unsaturated, halogenated synthetic rubbery materials to high unsaturation rubbers, e.g., natural rubber, butadiene-styrene (SBR) rubber, polybutadiene etc. More particularly, this invention relates to the curing of chlorinated butyl rubber with a system comprising a heavy metal oxide selected from the group consisting of zinc oxide, zinc peroxide and cuprous oxide and a dienophilic material. Still more particularly, this invention relates to the use of dienophilc materials containing a quinone structure. This invention is particularly applicable to the bonding of a halogenated butyl rubber tread to an auto tire carcass made of natural rubber, SBR, or blends thereof.

In the fabrication of various rubber articles, such as conveyor belts and automotive tires, it is frequently desirable to make one portion of the article from one kind of rubbery material and the other portion from some other kind of rubbery substance. An example of the foregoing type of bonding between dissimilar rubbery materials is the production of pneumatic tires. Here, it is necessary to form an adequate and firm bond between inner linings, treads or sidewalls, prepared from a relatively low unsaturated rubber, e.g., butyl rubber, and a more highly unsaturated conventional rubbery material, such as diene-styrene copolymers, natural rubber, and other highly unsaturated rubbers and mixtures thereof from which the carcass is ordinarily prepared.

Natural rubber, SBR rubber, acrylonitrile-butadiene (NBR) rubber and other high unsaturated rubbers differ greatly from butyl rubber in their chemical and physical properties as well as in their respective reactions to compounding, filling and vulcanizing agents. It is virtually impossible to adhere these dissimilar rubbery materials laminating rubber-like materials of similar properties. This is probably due to the fact that high unsaturated rubbers tend to react preferentially with the vulcanizing agents, thus robbing the butyl of its curatives. The result is an undercured layer of butyl rubber next to an overcured layer of high unsaturated rubber. This is reflected by poor bonds in laminated structures, sponging or blowing in blend vulcanizates and delamination under dynamic stress.

Many atempts have been made to adhere chlorinated butyl rubber inner liners to carcasses containing high unsaturated rubbery polymers and copolymers. For instance, the use of layers containing blends of 15–85 wt. percent of high unsaturation rubbers and 15–85 wt. percent of chlorinated butyl rubber, interposed between the inner liner and carcass, have been tried without materially increasing the adhesion of the liner to the carcass. It has also been proposed to unite a butyl rubber tread and a highly unsaturated rubber carcass by a system of strips (tie gums) of rubbery material so formulated that the tie gum adjacent to the tread will adhere to the tread, the tie gum adjacent to the outer carcass will adhere to the carcass and both strips forming the tie gum system will adhere to one another. However, difficulty has been experienced in obtaining satisfactory application of these tie gums to their respective components so as to protect the splice joints of these components from contact with the non-compatible rubber of the complementary component.

The present invention overcomes the foregoing difficulties and affords a means by which a low unsaturated, halogenated synthetic rubber may be bonded to a high unsaturated rubber. It is further known that unhalogenated interpolymers of isobutylene and a polyolefin can be cured with such compounds as quinone imines and quinone diimines in the required presence of an oxidizing agent such as lead dioxide. However, these cures have been found to be inadequate in solving the problem of adhering two dissimilar rubbers. It has now been discovered that dienophilic materials containing a quinone structure, i.e., those compounds comprising a special class of ketones in which the carbonyl groups are part of the ring, are useful as curing agents for low unsaturated halogenated rubbery polymers and further permit their adhesion to high unsaturated rubbery polymers or to blends of high unsaturated rubbery polymers. The instant cure system moreover alters the vulcanization mechanism to afford an increased cure rate. It also greatly improves ozone resistance as well as the compatibility of low unsaturated halogenated, synthetic rubbers, such as butyl rubber, with rubbery polymers of higher unsaturation. Furthermore, it improves heat aging resistance or processability as measured by the Mooney scorch test.

It is therefore a object of the present invention to provide an improved cure system for low unsaturated, halogenated, synthetic rubbery polymers. It is a further object of the present invention to provide a means by which low unsaturated, halogenated polymers can be bonded to high unsaturated rubbers to provide a lasting laminated material. A still further object of the present invention is to provide increased compatibility between halogenated, low unsaturated, synthetic rubbers and rubbers of higher unsaturation. These and other objects, as well as the advantages of the present invention, will become clear from the following description and examples.

According to the present invention, low unsaturated, halogenated synthetic polymers are compounded with a cure system comprising a heavy metal oxide selected from the group consisting of zinc oxide, zinc peroxide and cuprous oxide and a material containing a quinone, naphthoquinone or anthraquinone structure, e.g., p-benzoquinone and its homologues. Thereafter, they can be applied to a compounded but uncured highly unsaturated rubber surface, and the resulting laminate can be compressed and cured at temperatures between about 250° F. and about 450° F. to produce a high-strength union, junction or weld. It should be noted that the aforementioned novel cure system may or may not contain sulfur.

The low unsaturated synthetic polymers utilized with the present cure system are, in general, halogenated butyl and ethylene-propylene-diene terpolymer rubbers. These synthetic rubbers are characterized by a mole percent unsaturation of from about 0.5% to about 15%, corresponding to an iodine number of from about 3 to about 90, and will range in viscosity average molecular weight from about 20,000 to about 1,500,000.

Butyl rubber comprises a copolymer of a major proportion, advantageously about 85–99.9 wt. percent preferably 95–99.5 wt. percent of a $C_4$–$C_8$ isoolefin such as isobutylene, with a minor proportion of a $C_4$–$C_{14}$ multiolefin, preferably a $C_4$–$C_8$ diolefin, such as butadiene, dimethylbutadiene, piperylene, isoprene, allo-ocymene and the like; isoprene being preferred. The preferred polymer is obtained by reacting about 95–99.5 wt. percent of isobutylene, with about 0.5–5 wt. percent of isoprene. Cyclodiolefinic compounds such as cyclopentadiene and methylcyclopentadiene as well as compounds such as divinylbenzene, fulvene, and β-pinene may be incorporated with the isoolefin either in addition to the diolefin or in place of the diolefin. These additional compounds may be incoprated in amounts up to about 6 wt. percent based on issolefin, preferably in amounts from about 0.3 wt. percent to about 2.0 wt. percent. The preparation of butyl-type rubbers is described in chapter 24 of Synthetic Rubber by G. S. Whitby (editor-in-chief), John Wiley & Sons, 1954, as well as in U.S. Patent 2,356,128 to Thomas et al., among others.

In producing halogenated butyl rubber, unmodified, unvulcanized butyl rubber is halogenated so as to contain about at least 0.5 wt. percent preferably at least about 1.0 wt. percent combined halogen but not more than about "X" wt. percent combined chlorine or 3 "X" wt. percent combined bromine wherein:

$$X = \frac{M_3 L}{(100-1)M_1 + L(M_2+M_3)} \times 100$$

and:

L = mole percent of the multiolefin in the polymer
$M_1$ = molecular weight of the isoolefin
$M_2$ = molecular weight of the multiolefin
$M_3$ = atomic weight of chlorine or bromine.

Restated, there should be at least about 0.5 wt. percent of combined halogen in the polymer but not more than about one atom of chlorine or three atoms, preferably two atoms of bromine combined in the polymer per molecule of multiolefin present therein; i.e., not more than about one atom of combined chlorine or three atoms of combined bromine per double bond in the polymer.

Suitable halogenating agents which may be employed are gaseous chlorine, liquid bromine, iodine monochloride, alkali metal hypochlorites, sodium hypobromite, $C_4$ to $C_{10}$ tertiary alkyl hypochlorites or hypobromites, sulfur chlorides or bromides (particularly oxygenated sulfur chlorides or bromides), pyridinium chloride perchloride, N-bromosuccinimide, alpha-chloroacetoacetanilide, tribromophenol bromide, N - chloracetamide, N - bromophthalimide, N,N'-dimethyl-5, 5-dichloro or dibromohydantoin, and other common halogenating agents.

The halogenation is generally conducted at about −50° to about +150° C., advantageously at about 0° to 65° C., preferably at about 20° to 50° C. (room temperature being satisfactory), depending upon the particular halogenating agent, for about one minute to several hours. An advantageous pressure range is from about 0.5 to 400 p.s.i.a., atmospheric pressure being satisfactory. The halogenation conditions are regulated to halogenate the rubbery copolymer to the extent above mentioned.

The halogenation may be accomplished in various ways. For instance, the solid copolymer may be halogenated per se with a gaseous, liquid or solid halogenating agent. Another process comprises preparing a solution of the copolymer as above, in a suitable inert liquid organic solvent such as a $C_3$ to $C_{10}$ or preferably a $C_5$ to $C_8$ inert hydrocarbon or halogenated derivatives of saturated hydrocarbons, examples of which are hexane, heptane, naphtha, mineral spirits, cyclohexane, alkyl substituted cycloparaffin, benzene, chlorobenzene, chloroform, trichloroethane, carbon tetrachloride, mixtures thereof, etc., and adding thereto gaseous chlorine, liquid bromine, hydrogen fluoride, iodine monochloride, or other halogenating agent, which may optionally be in solution, such as dissolved in any inert hydrocarbon, and alkyl chloride, carbon tetrachloride, etc.

The concentration of the butyl rubber in the solvent will depend upon the type of reactor, molecular weight of the butyl rubber, etc. In general, the concentration of a butyl rubber having a viscosity average molecular weight of about 150,000 to about 1,500,000, if the solvent is a substantially inert hydrocarbon, will be between 1 and 30% by weight preferably about 5 to 20%. If chlorine gas is employed to chlorinate such a rubbery solution, it may also be diluted with up to about 50 times its volume, preferably about 0.1 to 5.0 times its volume of an inert gas such as nitrogen, methane, ethane, carbon dioxide, etc.

The resulting halogenated butyl rubber polymer may be recovered in various manner. The polymer may be precipitated with acetone or any other known non-solvent for the butyl rubber and dried under about 1 to 760 millimeters or higher of mercury pressure absolute at about 0° to 180° C., preferably at about 50° to 150° C. e.g., 70° C. Other methods of recovering the halogenated butyl rubber polymer from the hydrocarbon solution of the same are by conventional spray or drum drying techniques. Alternatively, the halogenated butyl rubber-containing solution may be injected into a vessel containing agitated water heated to a temperature sufficient to flash off the hydrocarbon solvent and form an aqueous slurry of the halogenated butyl rubber. The halogenated butyl rubber may then be separated from this slurry by filtration, dried and recovered as a "crumb" or as a dense sheet or slab by conventional milling and/or extruding procedures. The halogenated copolymer formed advantageously has a viscosity average molecular weight between about 150,000 and 1,500,000 and a mole percent unsaturation of between about 0.5% to about 15.0%, preferably about 0.6% to about 5.0%. The preparation of halogenated butyl rubber is described in U.S. Patent 2,944,578 to Baldwin et al., to which reference may be had for further details.

Ethylene-propylene-diene terpolymers are generally prepared by contacting a feed stream containing ethylene, propylene and a polymerizable diolefin with a Ziegler polymerization catalyst in the presence of an inert saturated hydrocarbon diluent having 5 to 8 carbon atoms, i.e., an alkane or cycloalkane such as N-pentane, isopentane, N-hexane, isohexane or N-octane. The feed stream is allowed to remain in contact with the catalyst for a period of time which usually does not exceed 5 hours at a temperature in the range of about −20° C. to about 150° C., preferably about 0° C. to about 80° C. As a matter of convenience, the copolymerization reaction is carried out at about 1 to 5 atmospheres pressures; however, pressures as high as 1000 p.s.i. can be employed if desired. The third polymerizable olefin which is employed is usually a nonconjugated diolefin having from 6 to 16 carbon atoms. Respective nonlimiting examples of this nonconjugated diolefin, which is either a linear or cyclic hydrocarbon, include 1,5-hexadiene, 1,5-octadiene, the 2-alkyl norbornadienes, etc. Halogenation of the ethylene-propylene-diene terpolymer is carried out in much the same manner as that used in halogenating butyl rubber. Conventionally, chlorine alone or with diluent, e.g., $N_2$ is passed into a benzene solution of about 1 wt. percent to about 15 wt. percent and preferably about 6 wt. percent of terpolymer at about 70° C until the desired chlorine level of about 1 wt. percent to about 10 wt. percent, preferably about 3 wt. percent to about 6 wt. percent is attained. The chlorinated terpolymer may be separated by alcohol precipitation or by steam distillation of the solvent.

By high unsaturated rubber is meant a rubber having an iodine number of from 200 to about 700. Examples of rubbers falling within this category are natural rubber or polyisoprene, butadiene-styrene rubber (SBR), polybutadiene, and acrylonitrile-butadiene rubber (NBR). Preparation of the aformentioned synthetic rubbers is fully discussed in chapters 7 and 23 of the aforementioned reference text, Synthetic Rubber by G. S. Whitby.

The low unsaturated, halogenated synthetic polymers are compounded with a curing system comprising a selective heavy metal oxide such as zinc oxide, and a dienophilic compound containing a quinone structure. The heavy metal oxide employed in conjunction with the dienophilic compound are selected from the group consisting of zinc oxide, zinc peroxide and cuprous oxide. Other heavy metal oxides ordinarily used in the compounding of rubber stocks, i.e., CaO, $MnO_2$, $Fe_2O_3$, PbO, $Pb_3O_4$, $PbO_2$, CuO, and the like, are inoperative in the present process for the reason that the compounded rubbery polymer fails to successfully cure.

The dienophiles utilized in the cure system of the present process are generically known as quinones. The quinones comprise a special class of ketones in which the carbonyl groups are part of the ring. The name "quinone" is the generic term applied to a family of compounds, but it is often used specifically to refer to p-benzoquinone, which is the most common representative of the family. As defined in Hackh's Chemical Dictionary, third edition (1944), page 711, the phrase, quinone compounds, means "a series of organic dioxy-derivatives of ring compounds that are characterized by the grouping,"

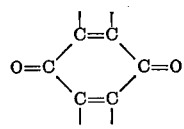

It is intended to cover this series or organic dioxy-derivatives by the use of such terms as quinone compounds, quinones, material containing a quinone structure and words of similar import in the present description.

A representative type selected from the above grouping is characterized by the following structural formula,

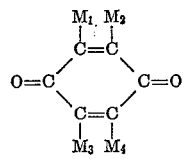

where $M_1$, $M_2$, $M_3$ and $M_4$ may be alike or different and can be hydrogen, hydroxy, $C_1$ to $C_8$ alkoxy, $C_1$ to $C_8$ acylamido, aryl, halogen, $C_1$ to $C_8$ alkyl, $-N(M_5)(M_6)$, wherein $M_5$ and $M_6$ are each selected from the group consisting of hydrogen and $C_1$ to $C_8$ alkyl, $-SO_3M_7$, wherein $M_7$ is selected from the group consisting of hydrogen and alkali metal, as well as any substituent radical having a single bond which can be coupled to the ring structure.

The general procedure for preparing a quinone starts with a phenol or an amine, followed by introduction of either a hydroxyl or an amino group in an ortho or para position and oxidation of the intermediate in acid solution. Conventionally, 1,4-benzoquinone is prepared by the oxidation of aniline with sodium dichromate in the presence of sulfuric acid.

The instantly utilized series of quinone compounds can be represented by the following formulae:

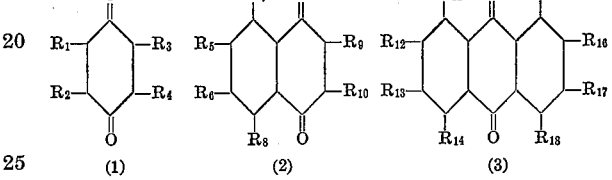

(1)   (2)   (3)

Shown here are (1) p-benzoquinone, (2) 1,4-napthoquinone and (3) 9,10-anthraquinone, wherein $R_1$–$R_{18}$ are hydrogen. In general, $R_1$–$R_{18}$ may be alike or different and can be any of the substituents previously specified for $M_1$, $M_2$, $M_3$ and $M_4$. It should be noted that regardless of the kind and frequency of substitution in the 2, 3, 5 and 6 position, the carbonyl groups remain intact and unchanged.

Representative substances coming within the scope of the above Formula 1 include: p-benzoquinone, diphenoquinone, toluqinone, xyloquinone, quinone dibromide, quinone tetrabromide, chloranil (tetrachloroquinone), chloranilic acid (2,5-dichloro-3,6-dihydroxy - p - benzoquinone), 2-phenyl - 1,4 - benzoquinone, 2 - hydroxy - 3-methoxy-6 methyl - p - benzoquinone, 2,5 - dihydroxy - 3-methoxy-6 methyl-p-benzoquinone, 2,6-dimethoxyquinone, 2,5-dihydroxy-3-hexylquinone, 2,5-dihydroxy - 3 - propylquinone, 2-isooctyl,-5-methyl - 6 - hydroxyquinone, 2,5-diphenyl-3,6-dihydroxyquinone, tetrahydroxy - p - benzoquinone, 2,5-dichloro-p-benzoquinone, 2,6 - dichloro - p-benzoquinone, 2,5-dimethyl-p-benzoquinone, 2 - methylamino-p-benzoquinone, 2 - dimethylamino - p - benzoquinone, 2-n-acetamido-p-benzoquinone, 2 - n - propionamido-p-benzoquinone, 2 - n - hexanoamido - p - benzoquinone and 2-sodium solfonato-p-benzoquinone.

Representative examples coming within the scope of Formulae 2 and 3 include: 1,4-naphthoquinone, 2-hydroxy-1,4-naphthoquinone, 2 - methoxy - 1,4 - naphthoquinone, 2-amino-1,4-naphthoquinone, 2anilino-1,4-naphthoquinone, 2-hydroxy-1,4-naphthoquinone, 2 - methyl-1,4-naphthoquinone, 2-methyl-3 - bromo - 1,4 - naphthoquinone, 2-methyl-3-hydroxy - 1,4 - naphthoquinone, 2,3-dichloro-1,4-naphthoquinone, 9,10-anthraquinone, 1,5-dichloroanthraquinone, 1,8-dichloroanthraquinone and 1,8-dihydroxyanthraquinone.

In practicing the present invention, the low unsaturated, halogenated synthetic rubbery polymer is compounded by mixing on a rubber mill, per 100 parts by weight of polymer, about 0.1 to about 15 parts, preferably about 1 to about 6 parts of a quinone compound and about 1 to about 50 parts, preferably about 2 to about 10 parts of the heretofore specified metal ovide. In addition, about 0 to about 100, preferably about 20 to about 60 parts by weight of a filler such as a clay, silica, silica-alumina or carbon black as well as conventional accelerators, tackifiers, antioxidants, extender oils, pigments, etc. may be compounded with the synthetic polymer. Other conventional compounding and vulcanizing agents may be used for various special applications.

When utilizing the compounded compositions as cement compositions, they normally will also contain substituted and substituted $C_6$ to $C_{13}$ aliphatic and aromatic hydrocarbon solvents such as hexane, decane, benzene, carbon tetrachloride, carbon disulfide, nitrobenzene, cyclohexane, xylene, chlorobenzene, ethylene dichloride, etc. A typical vulcanization recipe incorporating the present cure system is set forth in Table I as parts by weight per 100 parts of weight of halogenated rubbery polymer.

TABLE I

| Ingredient: | Phr. polymer |
|---|---|
| Low unsaturated halogenated rubbery polymer | 100 |
| SRF black | 50 |
| Flexon 845 [1] | 5 |
| ZnO | 5 |
| p-Benzoquinone | 2 |

[1] A paraffinic oil extender having a specific gravity of .865 and an aniline point of 216.

The order of addition of the quinone compound and the metal oxide to the low unsaturated, halogenated polymer is not critical when the addition is done at from about room temperature to about 150° F. However, when the melting point of the quinone compound is above 150° F., or if the quinone compound is difficult to disperse, it is preferable to add the quinone compound without the metal oxide and mix at temperatures up to about 300° F. and then allow the rubber stock to cool below 150° F. before adding the metal oxide.

The resulting compounded rubbery polymer is then formed into a desired shape, which may include any of the usual methods for the processing of rubber or rubber substances including extruding and calendering. The compounded synthetic rubber may then be cured at temperatures ranging from about 250° F. to about 400° F., but preferably in the range from about 300° F. to about 340° F., at a time interval ranging from about 5 minutes to about 200 minutes, but preferably from about 20 minutes to about 60 minutes.

The high unsaturation rubbery polymers are compounded in accordance with accepted procedures, e.g., using carbon blacks, accelerators, tackifiers, sulfur, antioxidants, extender oils, etc. Blends of halogenated low unsaturated rubbers and high unsaturated rubbers, e.g., a 50/50 blend of chlorinated butyl rubber and natural rubber can be prepared by simply mixing the rubbers on a mill or in a mixer followed by the addition of compounding ingredients. The amount of one of the dissimilar rubbers in such blends may vary anywhere from about 1 to about 99%.

In producing laminated rubber compositions, the two dissimilar rubbers are separately compounded and then united and compressed at pressures from about 50 p.s.i.g. to about 2000 p.s.i.g., advantageously at about 1000 p.s.i.g. to about 1500 p.s.i.g., by any suitable means such as in a rubber press and simultaneously vulcanized at temperatures of from about 250° F. to about 400° F., preferably about 300° F. to about 340° F. from a few minutes up to several hours or more, e.g., about 20 to about 60 minutes.

The above procedure may be employed to produce superior laminated materials suitable for use in constructing tires for automobiles, trucks, tractors, airplanes, etc., e.g., for adhering a butyl rubber tread or sidewall or air holding inner liner to a tire carcass made of SBR rubber, natural rubber or a mixture thereof, as well as for numerous other uses such as conveyor belts and other products built up of a plurality of laminations of dissimilar rubbers. This procedure is especially applicable to such products which have at least one layer of halogenated butyl rubber or blends thereof.

The preparation, properties, compounding vulcanization and use of the laminates of the present process are more fully set forth in the following examples which are intended as illustrative only since numerous modifications and variations therein will be apparent to those skilled in the art. For the sake of brevity, the adhesion aspects of the present novel cure system will, for the most part, be illustrated with natural rubber and 50/50 blends of natural rubber and SBR rubber. However, unless otherwise stated, any of the other highly unsaturated sulfur-vulcanizable rubbers mentioned hereinabove can be used to prepare the laminated compositions described herein.

The following test methods were employed to evaluate the properties of the formulated compounds presented in the ensuing examples. Tensile, elongation and modulus were evaluated according to ASTM method D 412–51T. A Shore A durometer, ASTM 676–58T, was used to determine the hardness of the vulcanizate. Ozone resistance was ascertained by clamping tensile specimens (ASTM Die C) at 50% extension in a bell jar containing 0.2 volume percent ozone at room temperature. The adhesion of low unsaturated synthetic rubbers to higher unsaturated rubbers was evaluated by preparing a spirally laminated pellet of the two rubbers (about 1 inch high and about ¾ inch in diameter), curing the pellet, and thereafter subjecting it to dynamic stress by means of a Goodrich Flexometer. (ASTM D 623–52T, Method A, at 212° F., stroke 0.25 inch, frequency—30 cycles/second, test duration—30 minutes). This test will hereafter be referred to as the spiral dynamic adhesion (SDA) test. Mooney Scorch was ascertained according to ASTM D 1646–59T run at 270° F. using the small (MS) rotor. Test specimens were warmed up one minute.

EXAMPLE 1

Enjay Butyl 218, a commercial grade of butyl rubber produced by the Enjay Chemical Company, having a viscosity average molecular weight of from about 350,000 to about 400,000, a mole percent unsaturation of from about 1.5 to about 2.0 and a Mooney viscosity (ML 8 min. at 212° F.) of from about 50 to about 60 was compounded as shown in Table II.

TABLE II

| Compound: | Parts by wt. |
|---|---|
| Enjay butyl 218 | 100 |
| SRF black | 50 |
| Flexon 845 | 5 |
| Zinc oxide | 10 |
| p-Benzoquinone | 2 |

This formulation was press cured for 30 minutes at 307° F., but it did not cure.

EXAMPLE 2

Enjay Butyl HT 10–66, a commercial grade of chlorinated butyl rubber produced by the Enjay Chemical Company, having a viscosity average molecular weight of from about 350,000 to about 400,000, a mole percent unsaturation of from about 1% to about 2%, a chlorine content of from about 1.1 wt. percent to about 1.3 wt. percent and a Mooney viscosity (ML 8 min. at 212° F.) of from about 50 to about 60, as well as a brominated butyl rubber having a viscosity average molecular weight of from about 400,000 to about 500,000, a mole percent unsaturation of from about 1.7% to about 2.0%, a bromine content of from about 2 wt. percent to about 3 wt. percent and a Mooney viscosity (ML 8 min. at 212° F.) of from about 60 to about 70 were compounded as shown in Table III on a cool 2 roll mill. The formulations shown in Table III were pressed cured at 307° F. for 30 minutes and their vulcanizate and adhesive properties evaluated. The results of those evaluations are tabulated in Table IV.

black, 10 phr. EPC black, 5 phr. Flexon 380 (highly aromatic extender oil), 1 phr, stearic acid, 3 phr, zinc

TABLE III

| | Compound (parts by weight) | | | | | | | | | |
|---|---|---|---|---|---|---|---|---|---|---|
| | 1 | 2 | 3 | 4 | 5 | 6 | 7 | 8 | 9 | 10 |
| Enjay butyl HT 10-66 [1] | 100 | 100 | 100 | 100 | 100 | | | | | |
| Brominated butyl rubber | | | | | | 100 | 100 | 100 | 100 | 100 |
| SRF black | 50 | 50 | 50 | 50 | 50 | 50 | 50 | 50 | 50 | 50 |
| Flexon 845 | 5 | 5 | 5 | 5 | 5 | 5 | 5 | 5 | 5 | 5 |
| Zinc oxide | 10 | 10 | 10 | 10 | | 10 | 10 | 10 | 10 | |
| Sulfur | | 2 | 2 | | | | | 2 | 2 | |
| Altax [2] | | 1 | 1 | | | | | 1 | 1 | |
| Methyl tuads [3] | | 0.5 | 0.5 | | | | | 0.5 | 0.5 | |
| p-Benzoquinone | | | 2 | 2 | | 2 | | 2 | 2 | 2 |

[1] Completely described in Bulletin 013 of the Enjay Chemical Company.
[2] Mercapto benzothiazole disulfide.
[3] Tetramethyl thiuram disulfide.

TABLE IV

| | Compound No. | | | | | | | | | |
|---|---|---|---|---|---|---|---|---|---|---|
| Vulcanizate Properties | 1 | 2 | 3 | 4 | 5 | 6 | 7 | 8 | 9 | 10 |
| Modulus (300%), p.s.i | 470 | 890 | 650 | 620 | Poor cure | 500 | 730 | 700 | 590 | 170 |
| Tensil, p.s.i | 1,270 | 1,000 | 1,100 | 1,380 | do | 1,260 | 1,140 | 1,150 | 1,640 | 700 |
| Elongation, percent | 600 | 385 | 585 | 680 | do | 680 | 560 | 760 | 755 | 765 |
| Hardness, Shore A | 52 | 56 | 55 | 52 | do | 51 | 56 | 58 | 54 | 50 |
| Ozone resistance: | | | | | | | | | | |
|   Minutes to crack | 8 | >203 | 8 | 5 | do | 8 | 71 | 10 | 3 | 3 |
|   Minutes to break | 31 | >203 | 25 | 16 | do | 21 | 80 | 20 | 11 | 12 |
| Mooney scorch: | | | | | | | | | | |
|   Minutes for 5 point rise | >30 | 17.0 | 13.6 | 10.0 | do | | | | | |
|   Minutes for 10 point rise | >30 | 19.8 | 20.2 | 10.8 | do | | | | | |
| After aging 16 hours at 400° F.: | | | | | | | | | | |
|   Modulus (200%) p.s.i | (1) | 425 | 175 | (1) | do | | | | | |
|   Tensile, p.s.i | (1) | 550 | 250 | (1) | do | | | | | |
|   Elongation, percent | (1) | 250 | 375 | (1) | do | | | | | |
|   Hardness, Shore A | (1) | 50 | 35 | (1) | do | | | | | |

Adhesion to Natural, Rubber [2] in Laminated Goodrich Flexometer Pellets (SDA Test) (Cured 45 minutes at 307° F.)

| | | | | | | | | | | |
|---|---|---|---|---|---|---|---|---|---|---|
| Flexometer load, lbs | 20 | 20 | 20 | 20 | Poor cure | 20 | 20 | 20 | 20 | 20 |
| Percent, initial dynamic compression | 23.8 | 12.6 | 10.4 | 8.5 | do | 11.0 | 7.3 | 3.4 | 5.6 | 22.5 |
| Dynamic drift | (3) | 0.019 | 0.015 | (4) | do | 0.096 | 0.004 | 0.008 | 0.027 | (7) |
| ΔT., ° C | (3) | 23.8 | 20.7 | (4) | do | 33 | 22 | 18 | 23 | (7) |
| Percent permanent set | (3) | 3.7 | 4.2 | (4) | do | 7.6 | 2.4 | 2.7 | 4.9 | (7) |
| Appearance inside pellet | (5) | (6) | (6) | (4) | do | (5) | (6) | (6) | (8) | (9) |

[1] Too tacky to test.
[2] Natural rubber compounds consisted of 100 parts natural rubber, 50 parts per hundred parts of rubber (phr.) SRF Black, 1 phr. AgeRite Stalite S (octylated diphenylamines), 2 phr. stearic acid, 5 phr. zinc oxide, 2.5 phr. sulfur, 1 phr. Altax and 0.3 phr. Methyl tuads.
[3] Failed at 1 min.
[4] Failed at 8 min.
[5] Delaminated, separation of the layers or thin sheets of the two vulcanizates.
[6] Solid.
[7] Failed at 6 minutes.
[8] Some delaminated.
[9] Delaminated and porous.

The data in Table IV show that a curve system of zinc oxide and p-benzoquinone results in a tighter and faster cure of halogenated butyl rubber than either the zinc oxide cure, zinc oxide-sulfur cure or zinc oxide-sulfur-p-benzoquinone cure. It also imparts exceptional ozone resistance to the vulcanizate as well as greater resistance to heat aging.

EXAMPLE 3

In order to further illustrate the functionality of the present novel cure system, a masterbatch of Enjay Butyl HT 10-66, SRF black and Flexon 845 was prepared on a cool 2 roll mill. To this masterbatch were added other curatives, as indicated in Table V. The resulting compounds were calendered and formed into spirally laminated pellets with a 50/50 natural rubber/SBR rubber blend which had a composition as follows: 50 parts natural rubber, 50 parts SBR rubber, 30 phr. FEF oxide, 1 phr. AgeRite Stalite S, 2.5 phr. sulfur, 1.25 phr. Amax (N - oxydiethylene benzothiazole - 2 - sulfenamide) and 0.25 phr. Altax. The pellets were cured for 35 minutes and 65 minutes at 307° F. and tested for dynamic adhesion by the SDA test with a 15 pound load. The results are taubulated in Table VI.

TABLE V

| | Compound (parts by weight) | | | | | | |
|---|---|---|---|---|---|---|---|
| | 1 | 2 | 3 | 4 | 5 | 6 | 7 |
| Enjay butyl HT 10-66 | 100 | 100 | 100 | 100 | 100 | 100 | 100 |
| SRF black | 50 | 50 | 50 | 50 | 50 | 50 | 50 |
| Flexon 845 | 5 | 5 | 5 | 5 | 5 | 5 | 5 |
| Zinc oxide | 10 | 10 | 5 | 10 | 10 | 10 | 10 |
| Sulfur | | | | | | 2 | 2 |
| Altax | | | | | | 1 | 1 |
| Methyl tuads | | | | | | 0.5 | 0.5 |
| p-Benzoquinone | | 2 | 2 | 1 | 4 | | 2 |

TABLE VI.—DYNAMIC ADHESION TO 50/50, NATURAL RUBBER BRS RUBBER

| | Compound Number | | | | | | |
|---|---|---|---|---|---|---|---|
| | 1 | 2 | 3 | 4 | 5 | 6 | 7 |
| 35 minute cure at 307° F.: | | | | | | | |
| Percent initial dynamic compression | 10.7 | 11.6 | 13.4 | 10.3 | 1.4 | 0.6 | |
| Δ T., ° C | 28 | 26 | 36+ | 28 | 30 | 25 | |
| Appearance inside pellet after test | (¹) | (²) | (²) | (²) | (²) | (⁴) | (²) |
| 65 minute cure at 307° F.: | | | | | | | |
| Percent initial dynamic compression | 12.5 | 6.9 | 8.3 | 10.3 | 8.0 | 0.4 | 1.0 |
| Δ T., ° C | | 25 | 28 | 48+ | 27 | 28 | 25 |
| Appearance inside pellet after test | (⁵) | (²) | (²) | (⁶) | (²) | (⁴) | (²) |

¹ Delaminated in <1 minute.
² Solid.
³ Some delamination.
⁴ Slightly delaminated.
⁵ Delaminated after 16 minutes.
⁶ Delaminated after 20 minutes.

The data in Tables V and VI show that halogenated butyl rubbers compounded with the present cure system can be successfully adhered to 50/50 blends of natural rubber and SBR rubber.

EXAMPLE 4

Spiral laminated test samples containing various quinone compounds in the chlorinated butyl rubber layer were prepared according to the procedure of Example 3. Each butyl rubber sample had the following composition: 100 parts Enjay Butyl HT 10–66, 50 phr. SRF black, 5 phr. Flexon 845, 5 phr. zinc oxide and 2 phr. quinone compound. The compounded natural rubber of Example 2 was used as the other layer of the laminate. The test samples were press cured for 45 minutes at 307° F. and tested for dynamic adhesion. The quinone compounds tested are listed in Table VII and the results of the SDA test are tabulated in Table VIII.

TABLE VII

| Compound No.: | Quinone compound |
|---|---|
| 1 | 2,6-dichloro-p-benzoquinone. |
| 2 | 2,5-dimethyl-p-benzoquinone. |
| 3 | 1,4-naphthoquinone. |
| 4 | Chloranil. |
| 5 | 2,5-dichloro-p-benzoquinone. |
| 6 | 2,3-dichloro-1,4-naphthaquinone. |
| 7 | 1,5-dichloroanthraquinone. |

TABLE VIII

| Compound | 1 | 2 | 3 | 4 | 5 | 6 | 7 |
|---|---|---|---|---|---|---|---|
| Load, lbs | 15 | 10 | 10 | 15 | 15 | 10 | 10 |
| Percent initial dynamic compression | 10.2 | −3.0 | 0.9 | 4.6 | −4.0 | 1.4 | −1.5 |
| Δ T.,° C | 13 | 11 | 22 | 28 | 19 | 22 | 20 |
| Appearance inside pellet after test | Solid | Solid | Solid | Solid | Solid | Solid | Solid |

The data of Table VIII show that a quinone compound zinc oxide cure of halogenated butyl rubber effects good adhesion to a high unsaturated rubber such as natural rubber. The success of the SDA test also indicates that the chlorinated butyl rubber has cured properly.

EXAMPLE 5

A number of heavy metal oxides and peroxides were tested with p-benzoquinone in rubbery samples of Enjay Butyl HT 10–66, SRF black and Flexon 845 according to the procedure of Example 2. Of those tested, only zinc oxide, zinc peroxide and cuprous oxide effected a successful cure. A partial list of those oxides which failed to give a cure include: MgO, CaO, CaO$_2$, SrO, CdO, BaO, BaO$_2$, HgO, CuO, Fe$_2$O$_3$, PbO, Pb$_3$O$_4$, PbO$_2$, Sb$_2$O$_3$, SuO, SnO$_2$, MnO$_2$, MoO$_3$, Co$_2$O$_3$, Ni$_2$O$_3$, V$_2$O$_5$, TiO$_2$ and P$_2$O$_5$. The succesful results obtained using zinc oxide, zinc peroxide or cuprous oxide are tabulated in Table IX.

TABLE IX

| | Compound No. | | |
|---|---|---|---|
| | 1 | 2 | 3 |
| Enjay butyl HT 10–66 | 100 | 100 | 100 |
| SRF black | 50 | 50 | 50 |
| Flexon 845 | 5 | 5 | 5 |
| Zinc oxide | 5 | | |
| Zinc peroxide | | 5 | |
| Cuprous oxide | | | 5 |
| p-Benzoquinone | 2 | 2 | 2 |
| Mooney scorch at 270° F.: | | | |
| Minutes for 5 point rise | 18.9 | 21.7 | 23.2 |
| Minutes for 10 point rise | 20.9 | 23.8 | 28.4 |
| Vulcanizate properties (30 minute cures at 307° F.): | | | |
| Modulus (300%), p.s.i | 945 | 900 | 540 |
| Tensile, p.s.i | 1,000 | 1,570 | 1,040 |
| Elongation, Percent | 360 | 530 | 545 |
| Hardness, Shore A | 55 | 50 | 48 |
| Ozone resistance: | | | |
| Minutes to crack | 215 | 25 | 5 |
| Minutes to break | 234 | 52 | 32 |
| SDA Test ¹ (Pellets cured 45 minutes at 307° .F): | | | |
| Flexometer load, lbs | 15 | 15 | 10 |
| Percent initial dynamic compression | 12.2 | 5.2 | −1.7 |
| Appearance inside pellet | Solid | Solid | Solid |

¹ Adhesion to compounded natural rubber of Example 2.

EXAMPLE 6

In this example test runs were performed according to the procedure of Example 2 to illustrate the difference between conventional quinone dioxime cures of halogenated butyl rubber and vulcanizates prepared by the present novel method. The data for these runs are tabulated in Table X.

TABLE X

| | Compound No. | | |
|---|---|---|---|
| | 1 | 2 | 3 |
| Enjay butyl HT 10–66 | 100 | 100 | 100 |
| SRF black | 50 | 50 | 50 |
| Flexon 845 | 5 | 5 | 5 |
| Zinc oxide | 5 | 5 | 5 |
| p-Benzoquinone | 2 | | |
| p-Quinone dioxime (GMF) | | 2 | |
| Lead dioxide ((PbO$_2$) | | 2 | |
| Poly-p-dinitrosobenzene (Polyac) | | | 2 |
| Vulcanizate properties (30 minute cure at 307° F.): | | | |
| Modulus (300%), p.s.i | 945 | 450 | 750 |
| Tensile, p.s.i | 1,000 | 725 | 1,150 |
| Elongation, percent | 360 | 450 | 490 |
| Hardness, Shore A | 55 | 44 | 48 |
| Ozone resistance: | | | |
| Minutes to crack | 215 | 38 | 9 |
| Minutes to break | 234 | 113 | 25 |
| Mooney scorch: | | | |
| Minutes for 5 point rise | 18.9 | 1.1 | 2.8 |
| Minutes for 10 point rise | 20.9 | 1.5 | 3.9 |
| SDA Test ¹ (45 minute cure at 307° F.): | | | |
| Percent initial dynamic compression | 1.9 | 7.2 | 3.4 |
| Δ T., ° C | 24 | 35 | 30 |
| Appearance inside pellet | (²) | (³) | (⁴) |

¹ Adhesion to compounded 50/50 natural rubber/SBR blend of Example 3.
² Solid.
³ Delaminated after 8 minutes.
⁴ Delaminated in center.

The data in Table X shows that the present cure system provides a faster and tighter cure than conventional dioxime cures. The data contained in Table X also demonstrates that this cure system provides better adhesion to blends of high unsaturated rubbers as well as increasing the ozone resistance.

EXAMPLE 7

In order to further demonstrate the utility of the present cure system in promoting adhesion, several runs were performed using chlorinated butyl rubber and blends thereof. These rubbers were adhered to a butadiene-styrene rubber having a composition as follows: 100 parts SBR rubber, 2 phr. stearic acid, 50 phr. SRF black, 1 phr. AgeRite Stalite S, 5 phr. zinc oxide, 2 phr. sulfur, 0.35 phr. Cumate (copper dimethyldithiocarbamate), 0.5 phr. Unads (tetramethylthiuram monosulfide) and 1 phr. Amax. Compounding data and results of the SDA test are tabulated in Table XI.

TABLE XI

| Compound | 1 | 2 | 3 | 4 | 5 | 6 |
|---|---|---|---|---|---|---|
| Enjay butyl HT 10-66 | 100 | 100 | 50 | 50 | 50 | 50 |
| SBR rubber | | | 50 | 50 | | |
| Natural rubber | | | | | 50 | 50 |
| SRF black | 50 | 50 | 50 | 50 | 50 | 50 |
| Flexon 845 | 5 | 5 | 2.5 | 2.5 | 2.5 | 2.5 |
| Zinc oxide | 5 | 5 | 5.0 | 5.0 | 5.0 | 5.0 |
| p-Benzoquinone | | 2 | | 2.0 | | 2.0 |
| Stearic acid | | | 1.0 | 1. | 1.0 | 1.0 |
| AgeRite stalite | | | 1.0 | 1.0 | 1.0 | 1.0 |
| Sulfur | | | 2.0 | 2.0 | 2.25 | 2.25 |
| Cumate [1] | | | 0.35 | 0.35 | | |
| Unads [2] | | | 0.50 | 0.50 | | |
| Amax | | | 1.0 | 1.0 | | |
| Methyl tuads | | | | | 0.4 | 0.4 |
| Altax | | | | | 1.0 | 1.0 |
| SDA Test (Cured 45 minutes at 307° F.): | | | | | | |
| Flexometer load | 10 | 10 | 44 | 44 | 35 | 35 |
| Percent initial dynamic compression | −4.4 | −6.6 | 9.3 | 10.1 | 10.2 | 8.4 |
| Δ T., °C | 23 | 12 | 32 | 30 | 37 | 28 |
| Appearance inside pellet | ([3]) | ([4]) | ([5]) | ([4]) | ([6]) | ([4]) |

[1] Copper dimethyldithiocarbamate.
[2] Tetramethylthiuram monosulfide.
[3] Delaminated.
[4] Solid.
[5] Delaminated after 19 minutes.
[6] Failed after 11 minutes.

The data in Table XI show that the present cure system improves the compatibility of blends of halogenated butyl rubber and higher unsaturated rubbers and improves the dynamic adhesion of halogenated butyl rubber and blends thereof to high unsaturated rubbers.

EXAMPLE 8

The effect of the present cure system on the dynamic properties of blends of dissimilar rubbers were determined as follows. 50/50 blends of chlorinated butyl with polybutadiene and with an acrylonitrile-butadiene rubber were compounded, formed into cylindrical pellets and cured for 45 minutes at 307° F. These pellets were then subjected to the SDA test. The compositions tested and inspections of the resulting dynamic properties are tabulated in Table XII.

TABLE XII

| Compound | 1 | 2 | 3 | 4 |
|---|---|---|---|---|
| Enjay butyl HT 10-66 | 50 | 50 | 50 | 50 |
| Polybutadiene | 50 | 50 | | |
| Acrylonitrile-butadiene rubber | | | 50 | 50 |
| SRF black | 50 | 50 | 50 | 50 |
| Flexon 845 | 2.5 | 2.5 | 2.5 | 2.5 |
| AgeRite stalite S | 1.0 | 1.0 | 1.0 | 1.0 |
| Stearic acid | 1.0 | 1.0 | 1.0 | 1.0 |
| Zinc oxide | 5.0 | 5.0 | 5.0 | 5.0 |
| Sulfur | 1.75 | 1.75 | 1.75 | 1.75 |
| Santocure [1] | 1.5 | 1.5 | x | |
| Altax | | | 1.5 | 1.5 |
| Methyl tuads | | | 0.1 | 0.1 |
| p-benzoquinone | | 2.0 | | 2.0 |
| SDA Test: | | | | |
| Flexometer load | 20 | 20 | 30 | 30 |
| Percent initial dynamic compression | 8.9 | 12.9 | 2.3 | 3.8 |
| Δ T., °C | 51 | 34 | 54 | 48 |
| Appearance inside | ([2]) | ([3]) | ([4]) | ([3]) |

[1] N-cyclohexyl-2-benzothiazole sulfenamide.
[2] Hole in center.
[3] Solid.
[4] Broke after 12 minutes.

The data in Table XII show that the dynamic properties of blends of halogenated butyl rubber and high unsaturated rubbers are significantly improved by the use of the present novel method.

Example 9

In order to demonstrate the effectiveness of the present cure system on an ethylene-propylene-diene terpolymer, the following run was performed. A terpolymer consisting of 65 mole percent ethylene, 32 mole percent propylene and 3% methylene norbornene was chlorinated at 69° C. The resulting product had an inherent viscosity of 2.46, an iodine number of 4.1 and contained 4.6 wt. percent chlorine. The chlorinated terpolymer was compounded as shown in Table XIII and cured for 30 minutes at 307° F. Inspections of the resulting vulcanizate properties are also shown in Table XIII.

TABLE XIII

| Compound | 1 | 2 |
|---|---|---|
| Chloro EPT | 100 | 100 |
| SFR black | 50 | 50 |
| Amberol ST 137X [1] | 5 | 5 |
| Flexon 845 | 5 | 5 |
| Zinc oxide | 5 | 5 |
| p-Benzoquinone | | 2 |
| Vulcanizate properties: | | |
| Modulus (300%), p.s.i. | 115 | 565 |
| Tensile, p.s.i. | 180 | 1,020 |
| Elongation, percent | 920 | 580 |

[1] Thermosetting resin of 4-octyl phenol-formaldehyde condensate used as a tackifier.

The data in Table XIII show that the present cure system is extremely effective in improving the vulcanizate properties of a halogenated ethylen-propylene-diene terpolymer.

While there are above described a number of specific embodiments of the present invention, it is obviously possible to produce other embodiments and various equivalent modifications and variations thereof without departing from the spirit of the invention.

Having now described and illustrated the invention, what is desired to be secured by Letters Patent is:

1. A curable rubbery composition which comprises, a vulcanizable low unsaturated halogenated rubber and a vulcanizable high unsaturated rubber, said low unsaturated halogenated rubber containing between about 1 and about 50 parts, per 100 parts of rubber, of a metal oxide selected from the group consisting of zinc oxide, zinc peroxide and cuprous oxide, and between about 0.1 and about 15 parts, per 100 parts of rubber of rubber, of a quinone compound containing two >C=O groups.

2. The composition of claim 1 wherein the vulcanizable low unsaturated halogenated rubber is selected from the group consisting of halogenated isoolefin-multiolefin copolymers and halogenated ethylene-propylene-diene terpolymers.

3. The composition of claim 1 wherein the compounded but unvulcanized high unsaturated rubber is selected from the group consisting of natural rubber, polybutadiene, butadiene-styrene rubber, acrylonitrile-butadiene rubber and blends thereof.

4. The composition of claim 1 wherein the quinone compound is p-benzoquinone.

5. The composition of claim 1 wherein the quinone compound is 2,6-dichloro-p-benzoquinone.

6. The composition of claim 1 wherein the quinone compound is chloranil.

7. The composition of claim 1 wherein the quinone compound is 2,5-dichloro-p-benzoquinone.

8. A rubbery vulcanizable composition of matter comprising, per 100 parts of a blend of low unsaturated halogenated rubber and high unsaturated rubber, between about 1 and about 50 parts of a metal oxide selected from the group consisting of zinc oxide, zinc peroxide and cuprous oxide and between about 0.1 and about 15 parts of a quinone compound selected from the series of organic dioxy-derivatives of ring compounds characterized by the grouping,

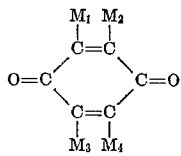

where $M_1$, $M_2$, $M_3$ and $M_4$ are each selected from the group consisting of hydrogen, hydroxy, $C_1$ to $C_8$ alkoxy,, $C_1$ to $C_8$ acylamido, aryl, halogen, $C_1$ to $C_8$ alkyl, —$N(M_5)(M_6)$, wherein $M_5$ and $M_6$ are each selected from the group consisting of hydrogen and $C_1$ to $C_8$ alkyl, and —$SO_3M_7$, wherein $M_7$ is selected from the group consisting of hydrogen and alkali metal.

9. The composition of claim 8 wherein the weight ratio of low unsaturated halogenated rubber to high unsaturated rubber is 1:1.

10. A curable rubbery composition which comprises, a vulcanizable blend of low unsaturated halogenated rubber and high unsaturated rubber, said vulcanizable blend containing between about 1 and about 50 parts, per 100 parts of blend, of a metal oxide selected from the group consisting of zinc oxide, zinc peroxide and cuprous oxide, and between about 0.1 and about 15 parts, per 100 parts of rubber, of a quinone compound containing two >C=O groups.

11. A curable rubbery composition which comprises, a vulcanizable blend of low unsaturated halogenated rubber and high unsaturated rubber, said vulcanizable blend containing between about 1 and about 50 parts, per 100 parts of blend, of a metal oxide selected from the group consisting of zinc oxide, zinc peroxide and cuprous oxide, and between about 0.1 and about 15 parts, per 100 parts of rubber, of a quinone compound selected from the series of organic dioxy derivatives of ring compounds characterized by the grouping,

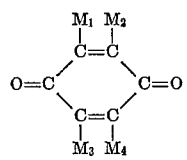

where $M_1$, $M_2$, $M_3$ and $M_4$ are selected from the group consisting of hydrogen, hydroxy, $C_1$ to $C_8$ alkoxy, $C_1$ to $C_8$ acylamido, aryl, halogen, $C_1$ to $C_8$ alkyl

—$N(M_5)(M_6)$ wherein $M_5$ and $M_6$ are each selected from the group consisting of hydrogen and $C_1$ to $C_8$ alkyl, and —$SO_3M_7$, wherein $M_7$ is selected from the group consisting of hydrogen and alkali metal.

12. A rubbery vulcanizable composition of matter comprising, per 100 parts of a blend of low unsaturated halogenated rubber and high unsaturated rubber, between about 1 and about 50 parts of a metal oxide selected from the group consisting of zinc oxide, zinc peroxide and cuprous oxide and between about 0.1 and about 15 parts of a quinone compound containing two >C=O groups.

13. A method for adhering low unsaturated halogenated rubbers to high unsaturated rubbers which comprises, compounding a vulcanizable low unsaturated halogenated rubber with between about 1 and about 50 parts, per 100 parts of rubber, of a metal oxide selected from the group consisting of zinc oxide, zinc peroxide and cuprous oxide, and between about 0.1 and about 15 parts, per 100 parts of rubber, of a quinone compound, placing a compounded, but unvulcanized, high unsaturated rubber adjacent to and in contact with said low unsaturated halogenated rubber, and curing the resulting laminate at a temperature of from about 250° F. to about 450° F. while maintaining the two compounded rubbers in contact with one another.

14. The method of claim 13 wherein the vulcanizable low unsaturated halogenated rubber is selected from the group consisting of halogenated isoolefin-multiolefin copolymers and halogenated ethylene-propylene-diene terpolymers.

15. The method of claim 13 wherein the high unsaturated rubber is selected from the group consisting of natural rubber, polybutadiene, butadiene-styrene rubber, acrylonitrile-butadiene rubber and blends thereof.

16. The method of claim 13 wherein the quinone compound is p-benzoquinone.

17. A method for adhering low unsaturated halogenated rubbers to high unsaturated rubbers which comprises, compounding a vulcanizable chlorinated butyl rubber copolymer of a major proportion of a $C_4$ to $C_8$ isoolefin and a minor proportion of a $C_4$ to $C_{14}$ multiolefin with between about 1 and about 50 parts, per 100 parts of rubber, of zinc oxide and between about 0.1 to about 15 parts, per 100 parts of rubber, of p-benzoquinone, placing a compounded, but unvulcanized, high unsaturated rubber adjacent to and in contact with said chlorinated butyl rubber, and curing the resulting laminate at a temperature of from about 250° F. to about 450° F. while maintaining the two compounded rubbers in contact with one another.

18. The method of claim 17 wherein the chlorinated butyl rubber copolymer comprises between about 85 and about 99.9 wt. percent of isobutylene and between about 15 and about 0.1 wt. percent of isoprene and wherein the high unsaturated rubber is a 50/50 blend of natural rubber and butadiene-styrene rubber, said chlorinated butyl rubber copolymer containing at least about 0.5 wt. percent combined chlorine but not more than about one combined atom of chlorine per double bond in the copolymer.

19. A method for adhering low unsaturated halogenated rubbers to high unsaturated rubbers which comprises compounding a vulcanizable low unsaturated halogenated rubber with between about 1 and about 50 parts, per 100 parts of rubber, of a metal oxide selected from the group consisting of zinc oxide, zinc peroxide and cuprous oxide, and between about 0.1 and about 15 parts, per 100 parts of rubber, of a quinone compound selected from the series of organic dioxy-derivatives of ring compounds characterized by the grouping,

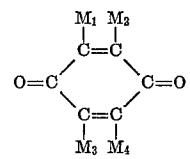

where $M_1$, $M_2$, $M_3$ and $M_4$ are each selected from the group consisting of hydrogen, hydroxy, $C_1$ to $C_8$ alkoxy, $C_1$ to $C_8$ acylamido, aryl, halogen, $C_1$ to $C_8$ alkyl, —N($M_5$)($M_6$), wherein $M_5$ and $M_6$ are each selected from the group consisting of hydrogen and $C_1$ to $C_8$ alkyl, and —$SO_3M_7$, wherein $M_7$ is selected from the group consisting of hydrogen and alkali metal, placing a compounded, but unvulcanized, high unsaturated rubber adjacent to and in contact with said low unsaturated halogenated rubber, and curing the resulting laminate at a temperature of from about 250° F. to about 450° F. while maintaining the two compounded rubbers in contact with one another.

20. A method for adhering blends of dissimilar rubbers to high unsaturated rubbers which comprises, compounding a vulcanizable blend of low unsaturated halogenated rubber and high unsaturated rubber with between about 1 and about 50 parts, per 100 parts of rubber, of a metal oxide selected from the group consisting of zinc oxide, zinc peroxide and cuprous oxide and between about 0.1 and about 15 parts of a quinone compound selected from the series of organic dioxy-derivatives of ring compounds characterized by the grouping,

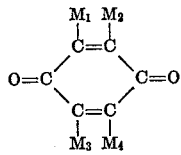

where $M_1$, $M_2$, $M_3$ and $M_4$ are each selected from the group consisting of hydrogen, hydroxy, $C_1$ to $C_8$ alkoxy, $C_1$ to $C_8$ acylamido, aryl, halogen, $C_1$ to $C_8$ alkyl, —N($M_5$)($M_6$), wherein $M_5$ and $M_6$ are each selected from the group consisting of hydrogen and $C_1$ to $C_8$ alkyl, and —$SO_3M_7$, wherein $M_7$ is selected from the group consisting of hydrogen and alkali metal, placing a compounded, but unvulcanized, high unsaturated rubber adjacent to and in contact with said vulcanizable blend, and curing the resulting laminate at a temperature of from about 250° F. to about 450° F. while maintaining the two compounded rubbers in contact with one another.

21. A method for adhering blends of dissimilar rubbers to high unsaturated rubbers which comprises, compounding a vulcanizable blend of low unsaturated halogenated rubber and high unsaturated rubber with between about 1 and about 50 parts, per 100 parts of rubber, of a metal oxide selected from the group consisting of zinc oxide, zinc peroxide and cuprous oxide and between about 0.1 and about 15 parts of a quinone compound having two >C=O groups, placing a compounded, but unvulcanized, high unsaturated rubber adjacent to and in contact with said vulcanizable blend, and curing the resulting laminate at a temperature of from about 250° F. to about 450° F. while maintaining the two compounded rubbers in contact with one another.

22. A curable rubbery laminate which comprises, a vulcanizable chlorinated rubbery copolymer of a major proportion of a $C_4$ to $C_8$ issolefin and a minor proportion of a $C_4$ to $C_{14}$ multiolefin adjacent to and in contact with a compounded but unvulcanized high unsaturated rubber, said rubbery copolymer containing between about 1 and about 50 parts, per 100 parts of rubbery copolymer, of zinc oxide and between about 0.1 to about 15 parts, per 100 parts of rubbery copolymer, of p-benzoquinone.

23. The laminate of claim 22 wherein the chlorinated butyl rubber copolymer comprises between about 85 and about 99.9 weight percent of isobutylene and between about 15 and about 0.1 weight percent of isoprene and wherein the high unsaturated rubber is a 50/50 blend of natural rubber and butadiene-styrene rubber, said chlorinated butyl rubber containing at least about 0.5 weight percent combined chlorine but not more than about one combined atom of chlorine per double bond in the copolymer.

24. A curable rubbery laminated which comprises, a vulcanizable low unsaturated halogenated rubber adjacent to and in contact with a compounded but unvulcanized high unsaturated rubber, said low unsaturated halogenated rubber containing between about 1 and about 50 parts, per 100 parts of rubber, of a metal oxide selected from the group consisting of zinc oxide, zinc peroxide and cuprous oxide, and between about 0.1 and about 15 parts, per 100 parts of rubber, of a quinone compound selected from the series of organic dioxy-derivatives of ring compounds characterized by the grouping,

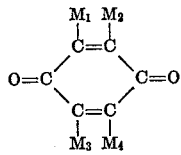

where $M_1$, $M_2$, $M_3$ and $M_4$ are each selected from the group consisting of hydrogen, hydroxy, $C_1$ to $C_8$ alkoxy, $C_1$ to $C_8$ acylamide, aryl, halogen, $C_1$ to $C_8$ alkyl, —N($M_5$)($M_6$), wherein $M_5$ and $M_6$ are each selected from the group consisting of hydrogen and $C_1$ to $C_8$ alkyl, and —$SO_3M_7$, wherein $M_7$ is selected from the group consisting of hydrogen and alkali metal.

References Cited

UNITED STATES PATENTS

| | | | |
|---|---|---|---|
| 2,891,595 | 6/1959 | Kuntz et al. | |
| 2,968,587 | 1/1961 | Baldwin et al. | 156—333 |
| 3,179,554 | 4/1965 | Gladding et al. | 161—216 |
| 2,879,823 | 3/1959 | Smith | 260—5 |
| 3,047,552 | 7/1962 | Reynolds et al. | 260—88.2 |
| 3,106,950 | 10/1963 | Ernst et al. | 152—330 |
| 3,157,560 | 11/1964 | Livingston et al. | 161—106 |

OTHER REFERENCES

Barron, Modern Synthetic Rubbers, Chapman and Hall, London (1949), p. 207 relied on.

EARL M. BERGERT, *Primary Examiner.*

W. E. HOAG, *Assistant Examiner.*

U.S. Cl. X.R.

156—306, 333, 334; 161—254, 255; 260—5, 41.5, 66, 888, 889